United States Patent [19]

Dahlerud

[11] Patent Number: 5,235,683
[45] Date of Patent: Aug. 10, 1993

[54] METHOD AND APPARATUS FOR ACCESSING PERIPHERAL STORAGES WITH ASYCHRONIZED INDIVIDUAL REQUESTS TO A HOST PROCESSOR

[75] Inventor: Ole-Chr Dahlerud, Oslo, Norway
[73] Assignee: Tandberg Data AS, Norway
[21] Appl. No.: 376,632
[22] Filed: Jul. 7, 1989

[30] Foreign Application Priority Data

Jul. 8, 1988 [DE] Fed. Rep. of Germany ....... 3823233

[51] Int. Cl.⁵ .................. G06F 3/05; G06F 3/06; G06F 11/18; G06F 13/14
[52] U.S. Cl. .................. 395/275; 364/236.3; 364/237.8; 364/237.9; 364/238.3; 364/239; 364/239.51; 364/239.9; 364/242; 364/242.91; 364/242.92; 364/251.4; 364/252.5; 364/259; 364/259.3; 364/267.6; 364/268.6; 364/269.1; 364/269; 364/269.4; 364/DIG. 1; 364/DIG. 2; 371/36
[58] Field of Search ............ 364/200, 908; 371/36, 371/12, 14, 13, 42, 46, 62, 68.1, 29.5; 395/700, 285, 325, 550, 800, 775

[56] References Cited

U.S. PATENT DOCUMENTS

| | | | |
|---|---|---|---|
| 3,805,284 | 4/1974 | Coon, Jr. et al. | 360/15 |
| 4,106,092 | 8/1978 | Millers, II | 364/200 |
| 4,189,769 | 2/1980 | Cook et al. | 364/200 |
| 4,340,775 | 6/1982 | Gesek et al. | 364/900 |
| 4,410,917 | 10/1983 | Newdoll et al. | 360/15 |
| 4,628,370 | 12/1986 | Fukuoka | 360/15 |
| 4,670,880 | 6/1987 | Jitsukawa et al. | 371/36 |
| 4,727,509 | 2/1988 | Johnson et al. | 395/425 |
| 4,835,671 | 5/1989 | Sato et al. | 371/12 |
| 4,860,216 | 8/1989 | Linsenmayer | 371/36 |
| 4,875,160 | 10/1989 | Brown, III | 364/200 |
| 4,888,728 | 12/1989 | Shirakawa et al. | 371/14 |

FOREIGN PATENT DOCUMENTS 8400239 1/1984 PCT Int'l Appl.

OTHER PUBLICATIONS

An Introduction to Computer Logic, H. Troy Nagle, Jr. B. D. Carroll, J. David Irwin, pp. 55-103, 1975, Prentice-Hall.
SCSI-2 Draft Proposed American National Standard, pp. A-1, A-2, 1—1, 1-2, Mar. 19, 1990.

Primary Examiner—Thomas C. Lee
Assistant Examiner—Daniel H. Pan
Attorney, Agent, or Firm—Hill, Steadman & Simpson

[57] ABSTRACT

Apparatus for duplicating data, especially in the form of multiple magnetic disks and tapes, includes a host processor (1) which functions as a data source and a plurality of peripheral storage devices (21 . . . 2n) which function as data receivers, connected to one another via a data bus and a control bus. In order to be able to transmit the data information in parallel, the storage devices are synchronized by means of a signal sequence comprising individual request signals (for example dREQ) from all of the storage devices, and acknowledgement signals (for example ACK) from the host processor, executed on a byte-by-byte basis, such that the slowest of the active storage devices determines the execution speed. The host processor can activate or de-activate all or only individual storage devices at any time in any arbitrary sub-combination.

8 Claims, 4 Drawing Sheets

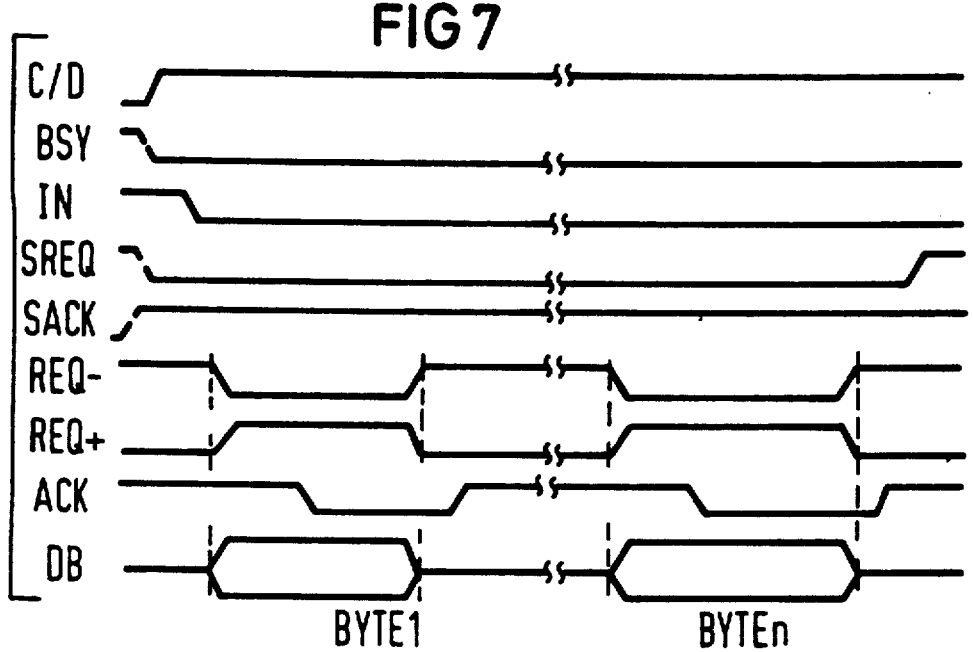
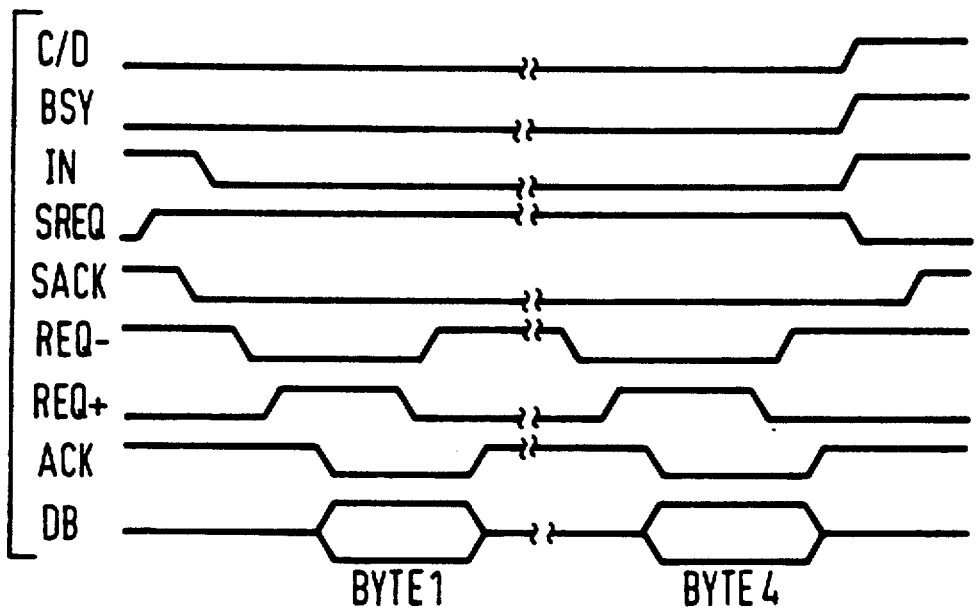

METHOD AND APPARATUS FOR ACCESSING PERIPHERAL STORAGES WITH ASYCHRONIZED INDIVIDUAL REQUESTS TO A HOST PROCESSOR

BACKGROUND OF THE INVENTION

The invention is directed to a method for duplicating the content of data carriers, and also to an apparatus for the implementation of this method.

With continuing advances in electronic data processing in all areas of the economy, the trend to make more and more computer capacity available directly at the work place, in addition to large data-processing systems, has intensified. This can occur in the form of what are referred to as intelligent terminal equipment: as, for example, in the case of personal computers, however, this can also occur in the form of small but nonetheless high-performance, independent computer systems. As a consequence of this trend, the same control information, in order to be able to handle specific program jobs, are required for a multitude of intelligent devices. More and more finished programs are also being developed and offered for this increasing plurality of decentralized or independent, intelligent modules. In practical terms, this means that a multitude of data carriers such as rigid or flexible magnetic discs and also magnetic tapes having identical data content, are produced more and more often and are frequently also sold as independent products.

The problem of duplicating the data content of such a data carrier in an optimally cost-beneficial fashion thus arises, i.e. to transfer the data content from one data carrier onto a plurality of identical or even different carriers. A mechanical pressing process, using a master plate comes into consideration for this purpose when optical storage media is used as data carriers. This mechanical technology, which has been known for a long time, is accordingly mature and cost-beneficial. Optical storage media, however, have not yet become common to a great extent. In the vast majority of cases, data carriers are used on which the information is magnetically stored. For the duplicating event, this means that a respectively separate storage device must be available for every data carrier to be written. The data information to be stored is taken from a data source that is permanently connected to the storage device or is designated to communicate with one of a plurality of connected storage devices via a bus system.

In the present case, this data source is referred to as a host processor, meaning every type of input/output computer of a centralized, decentralized or independent computer system that serves the purpose of exchanging data information with periphery storage devices is connected via a bus system. As already indicated, it is a characteristic feature of known input/output systems that the host processor in fact simultaneously services all connected, peripheral storage devices via the bus system; strictly considered, however, it is in communication with respectively only one of the connected storage devices at a defined point in time. In such a conventional input/output system, the processing performance of the host processor is designed such that it can service all requests for a data transfer of the slower, peripheral storage devices such that, on average, practically no dead times arise at the latter.

Such conventional input/output systems are also being presently utilized for duplicating data carriers; however, they are not optimally adapted to the special characteristics of such a duplicating process. The problem in producing a multitude of data copies cost-beneficially in an optimally short time span, i.e. of storing identical data information on data carriers of an optimally great plurality of peripheral storage devices simultaneously or, even better, actually in parallel. It can in fact be assumed in this copying event that copying is carried out onto data carriers of the same type, i.e. either onto magnetic hard disks, floppy disks or magnetic tapes as well. Without special measures however, it is not directly possible to connect a plurality of storage devices of even one type directly in parallel to the host processor and to thus transfer the data information to be copied into all connected storage devices in parallel with operational reliability and without data loss. This would only be possible if all peripheral storage devices worked in a mode in which they were exactly synchronized from the very beginning. Due to device tolerances, however, this cannot be assumed.

It is therefore the object of the present invention to design a method such that the duplication of data in true parallel operation of all peripheral storage devices connected to the host processor is possible with operational reliability and nonetheless with optimally low technological outlay. In view of this technological outlay, this should also mean that storage devices having conventional interfaces or, respectively, having optimally slight modifications of these interfaces can also be utilized for the implementation of the method of the invention. This object is inventively achieved by the features of the present invention.

In practical terms, this method enables synchronous storage events in a theoretically unlimited plurality of storage devices of the same type, whereby every storage device runs with its individual processing speed, which departs to a greater or lesser degree from that of neighboring storage devices. As usual, every storage device preferably has its own data buffer, so that individual error checks and error corrections, i.e. renewed storing of incorrectly stored blocks of the data information, is possible. All storage devices continue the storing event as long as data yet to be stored are contained in the data buffer. The host processor transfers data into the data buffers of the storage devices in parallel, i.e. updates the content of all connected data buffers simultaneously. With respect to the data transfer and its control, the effect of this for the host processor is as though it were collaborating with only one peripheral device. In comparison to a conventional input/output system, this, among other things, means that the host processor is significantly less burdened with the data transfer to the peripheral storage devices. No special demands are therefore made of the performance capability of the host processor even for a very extensive system comprising a multitude of connected, peripheral storage devices; the host processor can therefore also execute extensive test routines.

A particular advantage of this method becomes clear in an advantageous development of the invention that is directed to an apparatus for the implementation of this method. Only a slight amount of additional structure is required in order to guarantee the synchronization for a data transfer despite a multitude of connected, peripheral storage devices. In order to assure that a data request signal does not take effect in the host processor until all peripheral storage devices have output a corresponding data request, each peripheral storage device could output such a data request via its own control line. These individual data request signals of the individual storage devices would be logically operated with one another in that every individual control line is supplied to an input of an AND circuit having a corresponding plurality of inputs. The active output signal of this AND circuit would then be a suitable data request signal with which the host processor could be driven. This solution, however, would be technologically involved; moreover, it would be disadvantageous and would offer little flexibility with respect to know devices.

Instead of this, the solution of the invention makes use of the properties of what is referred to as a "wired AND" or a "wired OR" operation and uses output stages having an open collector output at the peripheral storage devices for outputting the individual data request signals. By contrast to push-pull output stages that are usually employed, such outputs can be connected in parallel without further ado, and can be operated via a common collector resistor. The potential on the common signal lines connected to all output stages fashioned in this way only lies at a high level when all outputs of the peripheral storage devices exhibit a high signal level. In positive logic, this corresponds to an AND operation. As known, an OR operation can be analogously realized in a corresponding fashion in negative logic.

In the present case, this known possibility of hardwired, phantom operations is advantageously utilized in order to logically operate the individual control requests of the individual peripheral storage devices with one another via only a few control signal lines and to supply them to the host processor. In the case of data requests, the corresponding output stages of the peripheral storage devices comprise two corresponding signal outputs for each open collector circuit, their signal statuses being activated inversely relative to one another. A wired AND operation or a wired OR operation can thus be respectively realized with one of the signal lines and an internal processor data request signal having corresponding signal statuses can be derived therefrom.

In addition to the low technological outlay, this implementation of the synchronization of the individual, connected storage devices for a parallel data transfer also achieves a high degree of flexibility. Viewed systematically, the system in and of itself is definitely not restricted to a specific plurality of peripheral storage devices that are connected and are to be operated. In case of a malfunction, it also allows a peripheral device to be individual? y deactivated without the overall system being deactivated. A monitoring routine must merely assure that a storage device that is momentarily malfunctioning must either disconnect itself on the basis of its own fault monitoring or must be deactivated by the host processor. There is thereby the subsidiary condition that such a deactivated storage device is compelled to generate simulated control signals so that the functionality of the overall system is not more deteriorated than unavoidable in the case of a device fault or outage.

In this application, too, the host processor exchanges a plurality of control signals with the peripheral storage devices, these control signals also being standard in other, conventional bus systems in order to control the data exchange. For executing defined tests or for interrogating the status of the storage devices, for example, the host processor can enter individually into communication with every individual storage device via corresponding addresses. Here, too, wired logic operations can be used. For example, this is valid given a status interrogation of the peripheral devices by the host processor. Among other things, it can thereby be identified via a wired AND operation whether all connected storage devices are ready to operate. When this is not the case even for only one of the connected storage devices, then the host processor identifies a corresponding signal status at the operated status signal. Then, however, it must individually interrogate the individual storage devices in order to identify which storage device is not ready to operate so that it can be deactivated.

Other developments and advantages of the invention derive from the following description of an exemplary embodiment with reference to the Drawings.

SUMMARY OF THE INVENTION

FIG. 7 illustrates pulse diagrams for explaining a data input status of the duplicating means in which, following an instruction status, one of the storage devices is selected in order to transmit data to the host processor; and FIG. 8 illustrates a further series of pulse diagrams for explaining a status condition of the duplicating means in which the execution of an instruction of the host processor by one or more of the peripheral storage devices is confirmed.

DESCRIPTION OF THE PREFERRED EMBODIMENT

Figure 1:
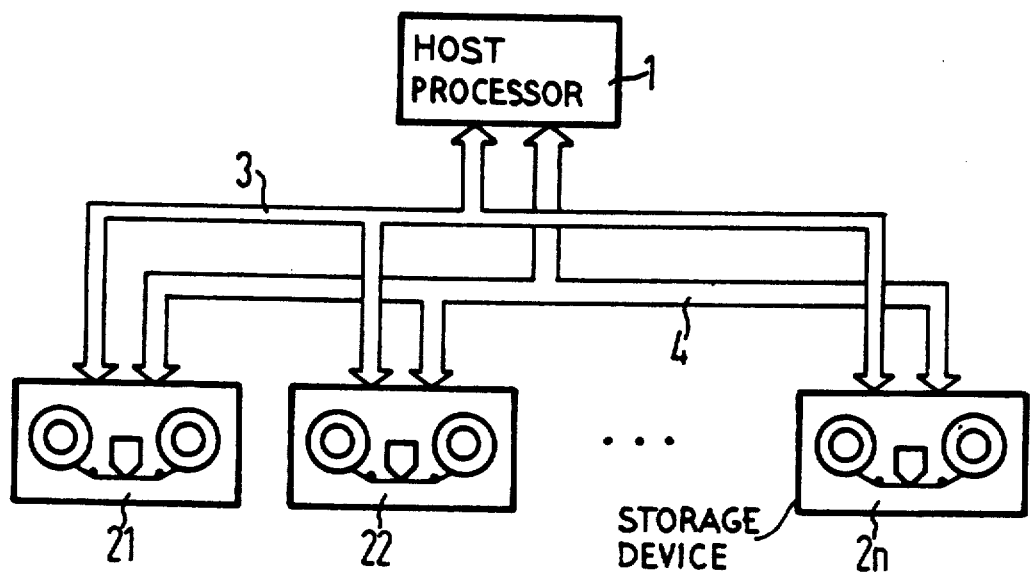
FIG. 1 illustrates a block circuit diagram of an arrangement for the exchange of data information and control information for duplicating data carriers, in accordance with the present invention.

FIG. 1 schematically shows a means for duplicating the content of data carriers with the assistance of a central host processor 1 and a plurality of peripheral storage devices 21 . . . 2n, here indicated as magnetic tape recorder means by way of example. The host processor 1 and the peripheral storage devices 21 . . . 2n are connected to one another via a respective data bus 3 and a control bus 4. For example, the data bus 3 is 9 bits wide in order to be able to transmit one data byte as well as a parity bit in parallel. The control bus 4 serves for the parallel transmission of a plurality of control signals, as shall be set forth later. The data bus 3 and the control bus 4 can be physically realized as a multi-lead ribbon cable. One of the cable ends is connected to corresponding terminals of the host processor 1 and each cable line is looped through in parallel to corresponding terminals of the peripheral storage devices 21, 22 through 2n. This system configuration requires an embodiment set forth in greater detail hereinafter, particularly of the control bus 4, and also requires corresponding interfaces of the host processor 1 and of the peripheral storage devices 2n.

Figure 2:
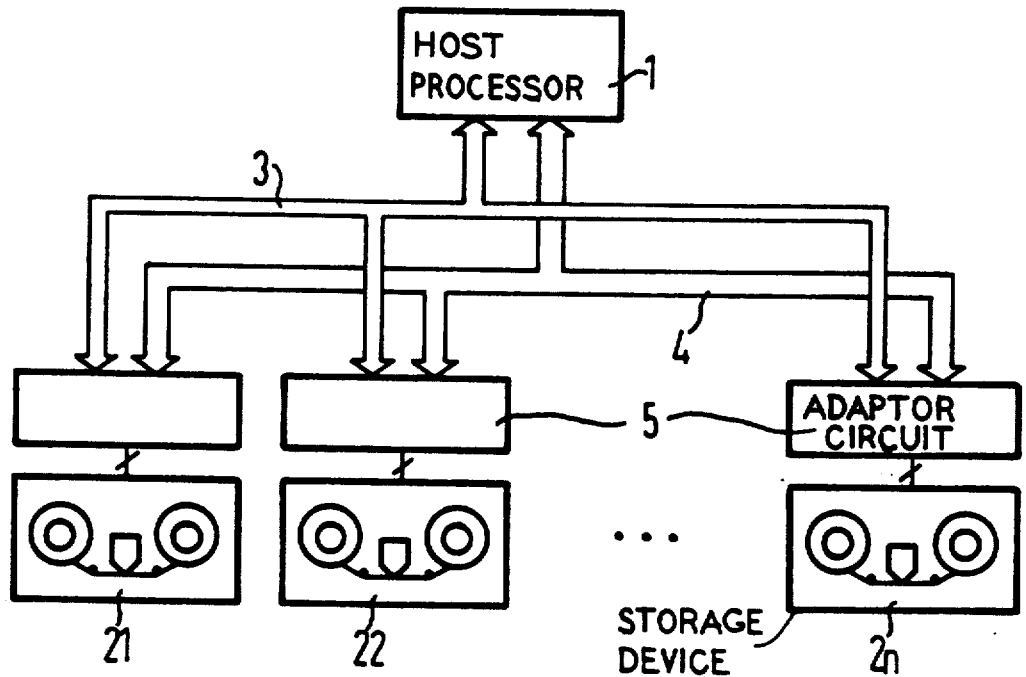
FIG. 2 is a block circuit diagram of an alternate arrangement for duplicating data carriers.

A modification of this system configuration for a means for duplicating the content of data carriers is schematically shown in FIG. 2. The particular aim herein is that storage devices 21 . . . 2n having standard interfaces can be utilized given such a system. Since both the system configuration of FIG. 1 as well as that of FIG. 2 for duplicating data carriers should perform a true parallel data transfer to all connected, peripheral storage devices n, specific control signals (yet to be explained) must be capable of being transmitted via the control bus 4, particularly for synchronizing the peripheral storage devices 21 . . . 2n. Since, of necessity, this is not directly possible via a standard interface, adaptor circuits 5 that enable a conversion of defined interface signals into prescribed control signals or, vice versa, precede the individual peripheral storage devices 21, 22, 2n in FIG. 2. The terminals at the bus side of these adaptor circuits 5 are connected to the data bus 3 or to the control bus 4 with its individual signal lines, similar to the system configuration according to FIG. 1.

In accord with its intended use, a conventional, peripheral storage device is fashioned such that it can exchange control and data information with a input-/output processor. It is also frequently standard that such an input/output processor simultaneously services a plurality of peripheral storage devices, and the information exchange with the connected, peripheral storage devices then ensues via a bus system. For the present case, it is therefore not necessary to describe a circuit-oriented realization of the system configuration shown in FIG. 1 in terms of all of its details. For reasons of clarity, only the special characteristics typical of the present application of duplicating stored data shall therefore be discussed below.

Figure 3:
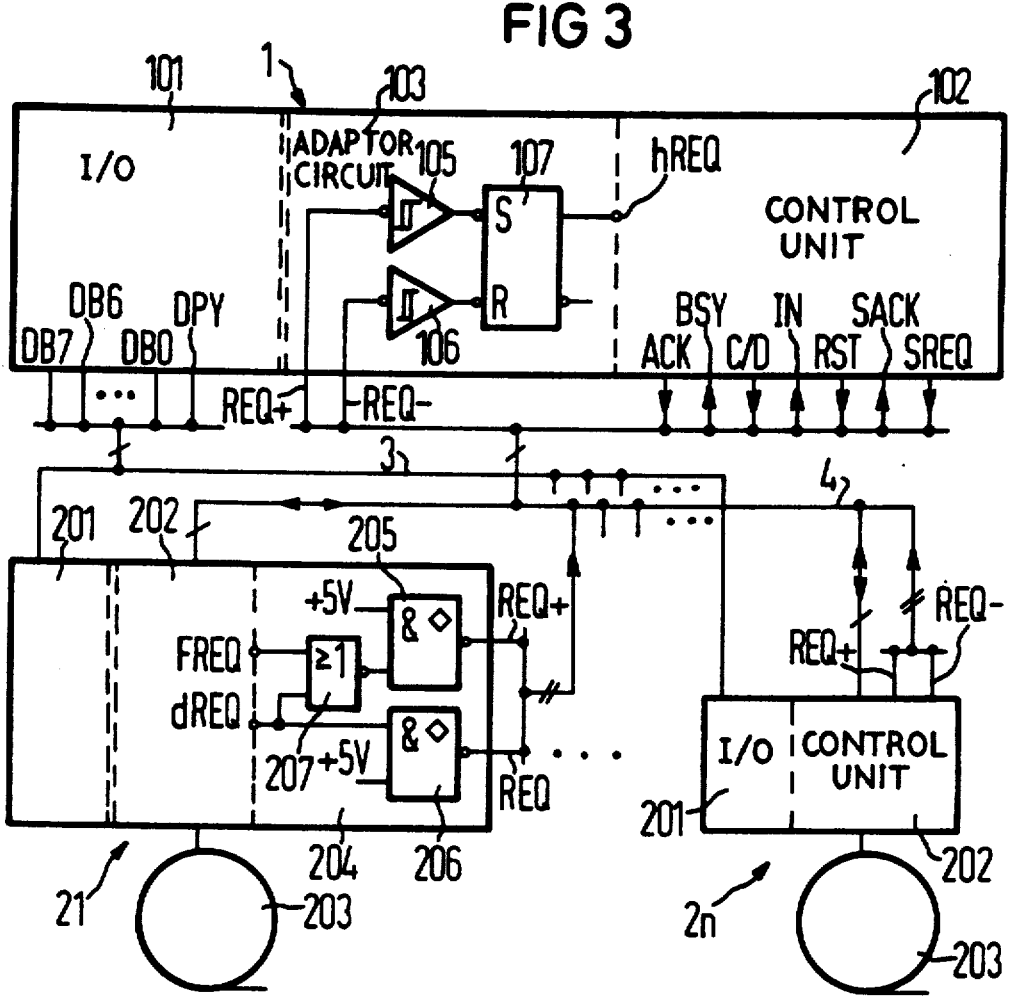
FIG. 3 is a block circuit diagram of the means schematically shown in FIG. 1 for duplicating the content of data carriers, the circuit for the transfer of deviceassociated request signals to the host processor as well as their decoding in the host processor being shown therein in detail.

FIG. 3 shows the critical circuit details of the system configuration shown in FIG. 1. In simplifying fashion, the host processor 1 is subdivided into an input/output unit 101 and into a control unit 102. An adaptor circuit 103 structurally forms a part of the control unit 102. The data bus 3 is connected to the input/output unit 101. It comprises nine data lines for parallel transmission of±a data byte comprising data bits DB7 through DB0. A parity bit DPY is transmitted on the ninth data line for data protection. The peripheral storage devices 21 . . . 2n are connected to the apparatus end of the data bus 3. For the sake of illustration, these storage devices 21 . . . 2n in FIG. 3 are subdivided into a data input/output unit 201 that essentially comprises a data buffer, into a control unit 202 and into a drive assembly 203 that accepts the data carried. A module of the control unit 202 of the storage devices 21 . . . 2n thereby forms a coder network 204 that forms the analog at the device side to the adaptor circuit 103 in the host processor 1.

The control unit 102 of the host processor 1 interfaces with the control units 202 of the peripheral storage devices 21 . . . 2n via the control bus 4. A brief description of the various control signals transmitted thereover shall now be provided. The host processor 1 generates an acknowledgement ACK in its control unit 102. The active signal status of this control signal defines the acknowledgement of the host processor 1 as a reply to a data request of the peripheral storage devices 21 . . . 2n.

An active signal BSY is transmitted from the peripheral storage devices 21 . . . 2n into the host processor 1. The active signal BSY received by the control unit 102 of the host processor 1 is a control signal that arises on the basis of a wired AND operation of individual active signals of the individual peripheral storage devices 21 . . . 2n. The operated active signal informs the host processor 1 that all peripheral storage devices 21 . . . 2n have entered into an instruction phase of a data exchange cycle.

A further control signal output by the host processor 1 is an instruction/data signal C/D that informs the connected peripheral storage devices 21 . . . 2n whether control information, i.e. instructions, or data information are being transmitted via the data bus 3.

Further, the host processor 1 receives an input signal IN. At the input of the host processor 1, this signal is a signal derived from individual input signals of the peripheral storage devices 21 . . . 2n, with the assistance of a wired OR operation. This signal informs the host processor 1 that all storage devices 21 . . . 2n are ready to send data via the data bus 3.

Further, the host processor 1 outputs a general reset signal RST with which it can reset all connected storage devices 21 . . . 2n into a defined condition.

For synchronizing the transmission of status information, the host processor uses a status acknowledgement signal SACK with which the host processor informs the connected, peripheral storage devices 21 . . . 2n that it is ready to receive status information.

This signal is the acknowledgement of the host processor 1 to corresponding request signals for a status transfer of the storage devices 21 . . . 2n. These individual request signals are supplied to the host processor as a status request signal SREQ via a wired AND operation.

It has been pointed out above that the control signals BSY, IN or, respectively, SREQ supplied to the host processor via the control bus are each derived from individual control signals output by the peripheral storage devices 21 . . . 2n, being derived by a wired logic operation. How this is realized in detail shall be set forth by way of example below with reference to two further control signals transmitted from the storage derives 21 . . . 2n to the host processor 1.

For reasons of synchronization, the host processor 1 may transmit data via the data bus 3 in parallel to the peripheral storage devices 21 . . . 2n only when all of these storage devices 21 . . . 2n are prepared to receive the data on the basis of their individual processing cycles. In order to assure this, request signals or, respectively, acknowledgement signals are exchanged between the peripheral storage devices 21 . . . 2n and the host processor 1. When, for example, the peripheral storage device 21 is ready to receive data information via the data bus 3, then it generates an individual data request signal dREQ in its control unit 202 in a known way. In the present case, all corresponding, individual request signals of the individual peripheral storage devices 21 . . . 2n are to be supplied to the control unit 102 of the host processor 1 in such fashion that a data request does not take effect in the host processor 1 and the acknowledgement signal ACK is not generated until all connected, peripheral storage devices 21 . . . 2n are ready for the data transfer.

In order to realize this logic operation of all individual data requests of the storage devices 21 . . . 2n, the coder networks 204 are respectively provided in the control units 202 of the storage devices 21 ... 2n. Every coder network comprises two output stages that are fashioned as NAND elements 205 or, respectively, 206. The lozenge symbols in the illustrations of these NAND elements 205, 206 of FIG. 3 identify that these logic elements comprise an open collector output. One respective input of the NAND elements 205 and 206 is hard-wired to high level, indicated by an operating voltage of +5 V. The second inputs of the NAND elements 205 and 206 are supplied with the apparatus-associated request signal dREQ inverted via an NOR element 207, directly, respectively.

The NOR element 207 also receives a forced request signal FREQ generated by the control unit 202. In case of a status of the corresponding peripheral storage device, for example of the storage device 21, that is not ready to operate because of an internal fault or the like, this request signal has the function of assuring that its outage does not lead to the blocking of the entire system configuration. Via a forced request signal FREQ, every storage device that is not ready to operate, i.e., is out of service, simulates a data request signal dREQ via the control bus 4. Regardless of the actual operating condition, thus, the readiness to receive data is thus constantly simulated. This measure makes it possible to conduct the outputs of all NAND elements 205 of the peripheral storage devices 21 ... 21n hard-wired in parallel via a signal line of the control bus 4 without blocking the system given a device outage. The analogous case applies to the outputs of the NAND elements 206. A respective operated positive and negative data request signal REQ+ and, respectively, REQ- is therefore supplied to the host processor 1 via two control lines. In the adaptor circuit 103 of the control unit 102 of the host processor 1, the corresponding control lines for transmitting these request signals REQ+, REQ- are respectively connected to the inverting input of a respective reception amplifier 105 and 106. The outputs of these reception amplifiers 105 and 106 are each connected to the setting and resetting input S or R of an RS flipflop 107, whose output emits an internal processor request signal hREQ.

Figure 4:
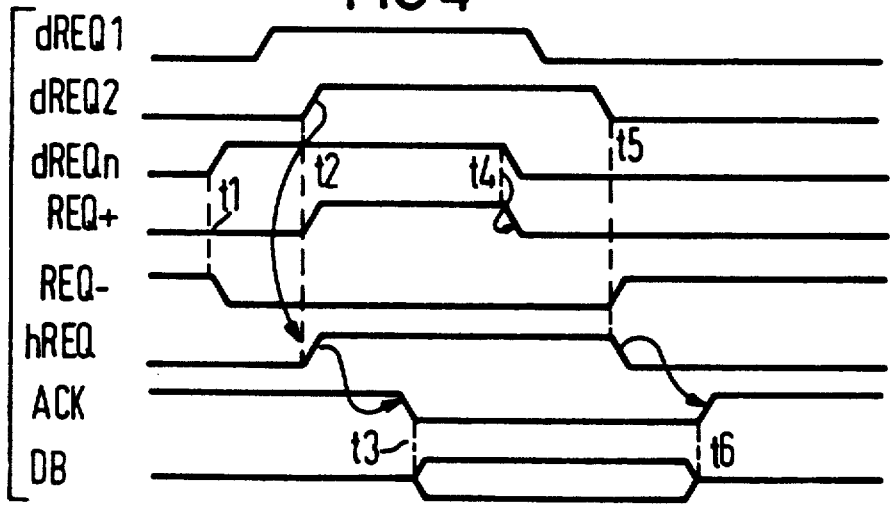
FIG. 4 illustrates a series of pulse diagrams for explaining the means illustrated in FIG. 3.

The function of the coder networks 204 of the peripheral storage devices 21 ... 2n in interaction with the adaptor circuit 103 of the control unit 102 of the host processor 1 shall now be set forth with reference to the pulse diagrams of FIG. 4. By way of example, the pulse shapes dREQ1, dREQ2 or, respectively, dREQn indicate device-associated request signals of individual peripheral storage devices 21, 22 or, respectively, 2n. In the set condition, these request signals have a high signal level. FIG. 4 is intended to illustrate that, for example, the storage device 2n is already ready for a data transfer at point in time t1 and accordingly activates its device-associated request signal dREQn. However, all device-associated request signals dREQ of the peripheral storage devices 21 ... 2n are not to be set until a later point in time t2. In the selected example of FIG. 4, the storage device 22 is the one that sets its device-associated request signal dREQ2 last. At this point in time t2, the NAND element 205 of the coder network 202 of the storage device 22 outputs a corresponding control signal with high level as the last storage device. As a result of the parallel connection of all open collector outputs of the NAND elements 205 of all coder networks 202 of the peripheral storage devices 21 ... 2n, the signal status of the operated, positive data request signal REQ+ thus changes at this point in time t2.

As a consequence thereof, the RS flipflop 107 is set via the reception amplifier 105 and the internal processor request signal hREQ assumes the high signal level. Let it be pointed out again at this point that this signal status of the RS flipflop 107 also appears at point in time t2 in case one of the peripheral storage devices 21 ... 2n is not momentarily ready to operate. With the corresponding, forced request signal FREQ, namely, the coder network 202 of a peripheral storage device that is not ready to operate also simulates a data request.

As soon as all operational storage devices 21 ... 2n are also ready to receive, the host processor 1 generates the acknowledgement signal ACK in its control unit 102 at a point in time t3, this acknowledgement ACK exhibiting a low level in the active condition. At this point in time t3, a data byte transmitted on the data bus 3 becomes valid, as indicated in the last line of FIG. 4. This acknowledgement signal ACK also initiates a retraction of the device-associated request signal dREQ in the control units 202 of the peripheral storage devices 21 ... 2n, so that the peripheral storage device 2n is the first to reset its device-associated request signal dREQn, for example at a point in time t4.

The wired AND operation of the signal outputs of the NAND elements 205 to form the positive data request signal REQ+ has been considered above. The analogous case a s applies to the hard-wiring of the signal outputs of the further NAND elements 206. As a result of the structure of the coder networks 204, however, a wired OR operation is realized in the further NAND element 206 as a result of the inversion of the apparatus-associated request signal dREQ. This means that the signal level of the operated, negative data request signal REQ- already changes with the first device-associated data request to appear at point in time t1. This signal status is maintained on the corresponding control line until the last device-associated data request signal is retracted at point in time t5, the signal dREQ2 in the example of FIG. 4. Let it thereby be emphasized that only the device-associated request signals of the peripheral storage devices 21 ... 2n that are actually ready to operate are interpreted in this case. At point in time t5, thus, a reset signal that resets the internal processor request signal hREQ thus takes effect at the reset input R of the RS flipflop 107. A signal change of the acknowledgement signal ACK is thereby triggered at point in time t6 in the control unit 102 with a certain delay time, so that signals on the data bus 3 become invalid.

The respective, logic operation or the function achieved therewith, have been set forth in detail above by way of example for the data request signals REQ+ or REQ-. Similar wired AND or OR operations are valid for the other control signals transmitted from the peripheral storage devices 21 ... 2n to the host processor 1, these operations being realizable in analogous form in terms of circuit technology. A detailed description of circuit details of the operation of these further control signals BSY, IN and, respectively, SREQ that are supplied to the host processor 1 therefore does not seem necessary.

All communication of the host processor 1 with the peripheral storage devices 21 ... 2n via the control bus 4 is based on a defined protocol having five different operating conditions whereof respectively only one is possible. These operating conditions comprise a waiting condition, an instruction condition, a data output condition with data proceeding from the host processor 1, and a data input condition with data to the host processor, and, finally, a status condition. With the exception of the data input condition, data transmitted on the data bus 3 are always valid for all connected storage devices 21 . . . 2n. In the data input condition, however, only one of the peripheral storage devices 21 . . . 2n transmits data into the host processor 1 at a defined point in time. This means that the host processor 1 must initially select one individual peripheral storage device 21 . . . 2n, in this case, before it transmits an instruction that initiates the operating condition "data input".

The waiting condition is characterized by the reset statuses of the instruction/data signal C/D and of the active signal BSY. This operating condition is automatically entered when the host processor 1 delivers the universal reset signal RST and, thus, places the system into a defined initial condition. Moreover, a waiting condition follows the status condition.

The instruction condition enables the host processor 1 to initiate defined functions in all connected, or in individually selected, peripheral storage devices 21 . . . 2n by transmitting specific instructions. In the present application, the duplication means should be constructed with conventional and commercially available modules given optimally low modification outlay. The instruction set that is used therefore contains instructions that are defined in standard interfaces such as, for example, the SCSI interface (small computer systems interface) and that are generally known. Further discussion of such instructions is therefore superfluous.

Over and above this, however, it should also be allowable to define further instructions specifically adapted to the given application of duplicating data. For example, such an instruction is a selection instruction in order to be able to select, i.e. activate any arbitrary combination of storage devices 21 . . . 2n maximally provided in the system. When, for example, it is assumed that a maximum of 32 peripheral storage devices are provided in the system configuration, then such a selection instruction could be constructed of 5 bytes, whereby 1 byte is the operation part. The individual storage devices 21 . . . 2n are individually selectable with the 32 bits of the other 4 bytes. Conversely, an instruction bit that is not set then defines a specific storage device that is not selected.

Other instructions can relate to specific test routines. Even in conventional input/output systems, the stored data are protected or, respectively, checked. In the present case of a means for duplicating data, such tests are accorded considerably more significance in order to produce copies that are in fact error-free. It is therefore conceivable, for example, to re-define a write check instruction "verify". With such an instruction, the host processor 1 should individually determine for which plurality of bytes the most recently written data this check should occur. Another instruction can be directed to writing a control block into selected storage devices 21 . . . 2n having a content that is transmitted from the host processor 1 to the peripheral storage devices 21 . . . 2n. When an error is identified in this context, the read-out of the control block recognized as faulty could be initiated with a further control instruction "read control block" for checking the error that has appeared. Many developments that serve the purpose of error protection and of checking the duplicated data are conceivable, essentially on the basis of a corresponding programming of the host processor 1 but also of the control units 202 of the peripheral storage devices 21 . . . 2n or, respectively, of the adaptor circuits 5. The examples cited here ar therefore only to be interpreted as being a selection.

Figure 5:
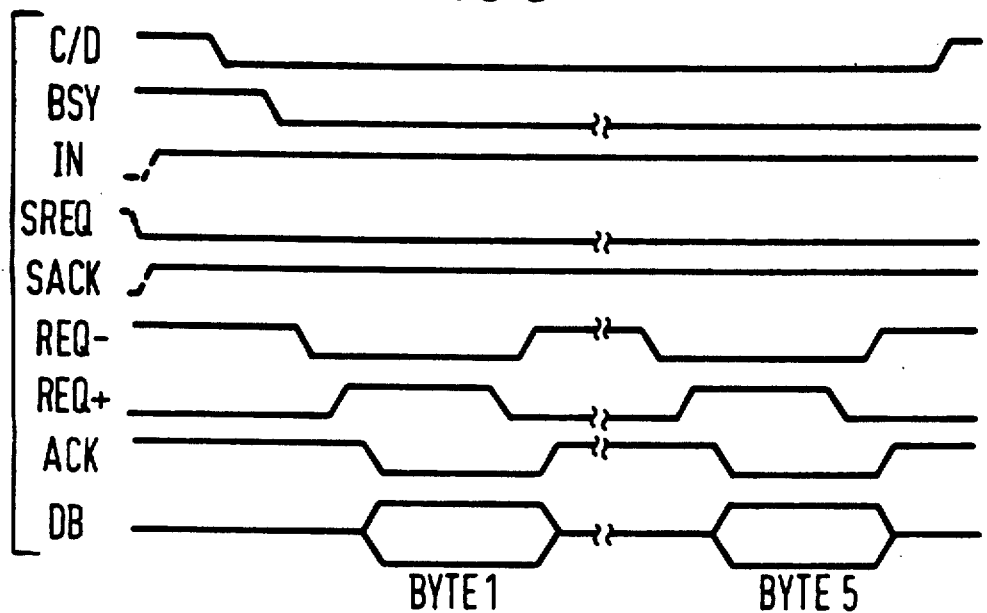
FIG. 5 illustrates a series of pulse diagrams for explaining an status of the duplicating means.

The execution during an instruction condition shall now be immediately explained on the basis of the pulse diagrams of FIG. 5 following this overview of a possible instruction set. The instruction condition is entered as soon as the instruction/data signal C/D is set to low level. All peripheral storage devices 21 . . . 2n should react to this signal change so that they reset all control signals directed to the host processor 1. After a defined delay time, the peripheral storage devices 21 . . . 2n should then reply to the status change of the instruction/data signal C/D by setting the active signal BSY, as shown in line 2 of FIG. 5. Other control signals such as the input signal IN, the status request signal SREQ or, respectively, the status acknowledgement signal SACK that are shown in the next lines of FIG. 5 do not change their signal status during the instruction condition.

As already set forth in detail above with reference to FIG. 4, first the negative and then the positive data request signal REQ− and, respectively, REQ+ are then conducted to the host processor 1 in succession following a further delay. The corresponding pulse shapes are shown in the next two lines of FIG. 5. The host processor 1 responds thereto with the acknowledgement signal ACK. It therewith identifies the first instruction byte that is transmitted via the data bus 3 as being valid for a defined time span. As set forth, first the positive data request signal REQ+ and, subsequently, the negative data request signal REQ− are again reset in this time span. The transmission of the first instruction byte is concluded with the resetting of the acknowledgement signal ACK by the host processor 1.

This sequence is carried out a total of five times in order to successively transmit all five instruction bytes to all connected, peripheral storage devices 21 . . . 2n, as indicated in FIG. 5. The transmission of the instruction is concluded with the transmission of the fifth instruction byte and the host processor 1 ends the instruction condition by a status change of the instruction/data signal C/D.

It must be pointed out that all storage devices 21 . . . 2n, even the storage devices that are not momentarily selected, must enter into the instruction condition in order to read the five instruction bytes. Namely, every instruction could be a selection instruction in order to now select one of the peripheral storage devices 21 . . . 2n that was not hitherto selected. This peripheral storage device that has been newly selected must then follow a normal instruction sequence; as non-selected device, it otherwise ignores the instruction.

Figure 6:
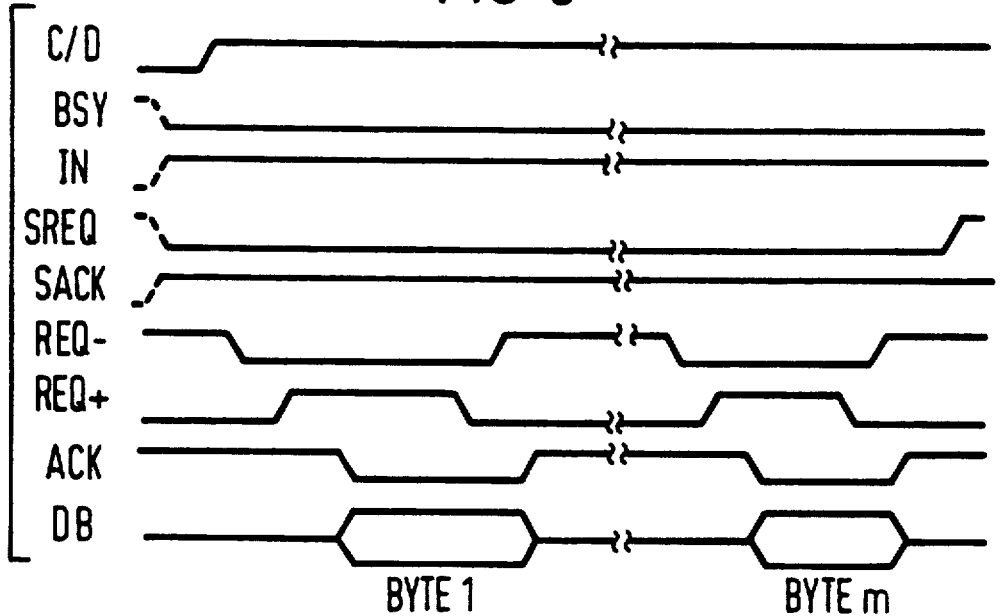
FIG. 6 illustrates corresponding pulse diagrams for explaining a status of the duplicating means.

The sequence in the data output condition shall now be set forth with reference to FIG. 6. This operating condition can only be entered when an instruction condition has preceded. The data output condition serves the purpose of transmitting instruction parameter information or data information that are to be duplicated. The data output condition is characterized by the high level of the instruction/data signal C/D, as shown in line 1 of FIG. 6. The active signal BSY and the input signal IN do not change their signal status in the data output condition, as shown in the next two lines of FIG. 6. The status request signal SREQ is initially reset, so that the status acknowledgement signal also does not change its signal status. This is shown in the next two lines of FIG. 6. The remaining pulse shapes that relate to the negative and positive data request signal REQ− and, respectively, REQ+ and to the acknowledgement signal ACK have already been described above, so that further mention is superfluous here.

The described sequence is multiply repeated until the ast byte BYTEm of the corresponding data transfer is transmitted. After conclusion of the data transfer and a certain delay time, all peripheral control devices 21 ... 2n output the status request signal SREQ. As soon as this operated request signal takes effect in the host processor 1, it is thus defined that all peripheral storage devices 21 ... 2n are ready to transmit status information. In order to assure the orderly execution in the data output condition, all peripheral control devices 21 ... 2n, even those that were not selected or those devices that did not properly terminate the data transmission for other reasons, must output or, respectively, simulate data and status request signals. Only then is the orderly operation of the corresponding signals taking effect in the host processor 1 possible The sequence of the data input condition shall now be set forth with reference to the pulse shapes of FIG. 7. As shown in line 1 of FIG. 7, the command/data signal C/D proceeds to high condition on the basis of a status change; the active signal BSY is reset during the entire condition (see the second line of FIG. 7). The data input condition is initiated by resetting of the input signal IN, as shown in line 3 of FIG. 7. This condition can be entered only following the instruction condition. Namely. it serves the purpose of transmitting status information of the peripheral storage devices 21 ... 2n or, respectively, data again read out in a peripheral storage device to the host processor 1. The data input condition is in fact valid for all connected storage devices 21 ... 2n; however, only one selected storage device can transmit data at one time. In case the host processor 1 has still selected more than one peripheral storage device, then all selected storage devices must output a status request signal SREQ in order to initiate conversion into the status condition.

For this reason, the data input condition is defined by the resetting of the input signal IN, corresponding to the third line of FIG. 7, and by the resetting of the status request signals SREQ, as indicated in the fourth line of FIG. 7. Moreover, the data transfer is now carried out in the reverse direction to the host processor 1, analogous to the data transfer set forth up to now, being carried out byte by byte until the last data byte is transmitted. Only the special characteristic that the operated data request signals REQ+ or, respectively, REQ− are exactly antiphase must be considered since, of course, only one of the peripheral storage devices 21 ... 21n is active in this condition. For concluding the data input condition, the active storage device finally sets an individual status request signal, so that the correspondingly operated status request signal SREQ takes effect in the host processor 1, as shown in line 4 of FIG. 7.

The various pulse shapes in FIG. 8 illustrate the execution in the status condition. This status condition serves for the completion of the execution of an instruction. The status condition is entered either directly after the instruction condition, after the data output condition or after the data input condition. During the status condition, all selected storage devices 21 ... 2n inform the host processor 1 whether the preceding instruction was correctly executed or not. All selected storage devices 21 ... 2n set individual status request signals from which the AND operated status request signal SREQ is derived. On the basis of this AND operation, status requests of the individual storage devices 21 ... 2n do not take effect in the host processor 1 until all storage devices 21 ... 2n have delivered a status request.

This is initially illustrated in FIG. 8 by the pulse shapes shown in the first two lines. The instruction/data signal C/D and the active signal BSY are in their reset condition. The operated status request signal SREQ shown in the fourth line changes its signal status as soon as the AND operation has assured that all selected storage devices 21 ... 2n have output their individual status request. The host processor 1 responds thereto with the status acknowledgement signal SACK, as shown in the following line of FIG. 8, and thus enters into the status condition.

The selected storage devices 21 ... 2n thereupon generate the corresponding input signal IN that is shown in its operated form in line 3 of FIG. 8 and that takes effect in the host processor 1. After a stabilization time of at least 400 ns, the selected storage devices 21 ... 2n output a first status byte and thereby utilize the signal sequence already described a number of times that is composed of the operated data request signals REQ+ and REQ− or, respectively, the acknowledgement signal ACK following thereupon. This sequence is repeated until all status bytes are transmitted, four bytes are involved in the present example comprising a maximum of 32 connected storage devices. Thereupon, the input signal IN, the status request signal SREQ from the peripheral storage devices 21 ... 2n is retracted and the host processor 1 responds thereto with the retraction of the status acknowledgement signal SACK.

Every storage device 21 ... 2n individually sets a status bit allocated to it in the status byte when it determines in its device-associated monitoring that the preceding instruction was not properly concluded. The host processor 1 learns from the received status information whether an error appeared in one of the devices. However, it can not yet identify the nature of the error. To that end, it must individually select every faultily functioning storage device and must exchange further information with it.

It will be apparent that various modifications and/or additions may be made in the apparatus of the invention without departing from the essential feature of novelty involved, which are intended to be defined and secured by the appended claims.

What is claimed is:

1. A method of duplicating the content of data carriers employing a central host processor connected as a data source and a plurality of peripheral storage devices, each of which comprises at least one data carrier, that are each connected to the host processor via a data bus and a control bus, for exchanging data and controlling information, comprising the steps of:

transmitting asynchronously to the host processor individual request signals from said peripheral storage devices that do not take effect in the host processor until all storage devices have transmitted such a request;

after only all request signals have been transmitted, causing the host processor to transmit asynchronously to said storage devices data information via the data bus and to further transmit an acknowledgement signal via the control bus to said storage devices in parallel, said acknowledgement signal identifying the transmitted data information as being valid;

initiating a resetting of the individual data request signals in the storage devices in response to said acknowledgement signal;

resetting the individual data request signals in the host processor only after a resetting of all individual request signals in the storage devices; and causing the host processor to thereupon retract its acknowledgement signal.

2. The method of duplicating the content of data carriers according to claim 1, further including the steps of:

constantly generating an instruction/data signal by the host processor as a control signal whose two signal statuses identify, respectively, information transmitted via the data bus as control information for setting specific function statuses of the storage devices or data information to be stored; and activating any arbitrary sub-combination of a prescribed maximum number of connectable, peripheral storage devices for subsequent processing steps in response to said control information until the host processor undertakes a renewed selection of active storage devices in a different combination that potentially comprises only a single storage device.

3. The method of duplicating the content of data carriers according to claim 2, further including the steps of:

transmitting individual status request signals from said storage devices via the control bus after the execution of a function sequence controlled by the host processor, said individual status request signals tracking effecting in the host processor as soon as all connected storage devices generate said individual signals;

transmitting a further acknowledgement signal from the host processor to storage devices to activate the data bus for the transmission of status information from the peripheral storage devices to the host processor;

the synchronized transmission of said status information in byte-by-byte fashion by a sequence of data request signals of the storage devices and acknowledgement signals of the host processor.

4. The method for duplicating the content of data carriers according to claim 3, including the steps of:

monitoring for a proper execution of a function in every active storage device after the execution of a function execution prescribed by the host processor;

outputting of an individual bit signal by the storage device as a result of said monitoring, the signal status thereof identifying the error-free execution or, alternatively, a faulty apparatus condition and residing at a defined position within the status information that is determined for the respective storage device; and checking the communicated status information in the host processor and selecting a malfunctioning storage device subsequently in order to exchange further control information with it, and identifying the nature of the error and deactivating the malfunctioning storage device in case the identified error cannot be eliminated.

5. An apparatus for duplicating the content of data carrier comprising:

a central host processor connected as a data source and a plurality of peripheral storage devices, each of which has at least one data carrier, each of said storage devices being connected to the host processor via a data bus and a control bus, for exchanging data and controlling information;

means for asynchronously transmitting to the host processor individual request signals from said peripheral storage devices that do not take effect in the host processor until all storage devices have transmitted such a request;

means for only after all request signals have been transmitted, causing the host processor to asynchronously transmit to said storage devices data information via the data bus and to further transmit an acknowledgement signal via the control bus to said storage devices in parallel, said acknowledgement signal identifying the transmitted data information as being valid;

means for initiating a resetting of the individual data request signals in the storage devices in response to said acknowledgement signal;

means for resetting the individual data request signals in the host processor only after a resetting of all individual request signals in the storage devices; and means for causing the host processor to thereupon retract its acknowledgement signal.

6. The apparatus for duplicating the content of data carriers according to claim 5, further comprising:

means for constantly generating an instruction/data signal by the host processor as a control signal whose two signal statuses identify, respectively, information transmitted via the data bus as control information for setting specific function statuses of the storage device or data information to be stored; and means for activating any arbitrary sub-combination of a prescribed maximum number of connectable, peripheral; storage devices for subsequent processing steps in response to said control information until the host processor undertakes a renewed selection of active storage devices in a different combination that potentially comprises only a single storage device.

7. The apparatus for duplicating the content of data carriers according to claim 6 further comprising:

means or transmitting individual status request signals from said storage devices via the control bus after the execution of a function sequence controlled by the host processor, said individual status request signals taking effect in the host processor as soon as all connected storage devices generate said individual status request signals taking effect in the host processor as soon as all connected storage devices generate said individual signals;

means for transmitting a further acknowledgement signal from the host processor to the storage devices to activate the data bus for transmission of status information from the peripheral storage devices to the host processor;

means for synchronizing the transmission of said status information in byte-by-byte fashion by a sequence of data request signals of the storage devices and acknowledgement signals of the host processor.

8. The method for duplicating the content of data carriers according to claim 7, further comprising:

means for monitoring for a proper execution of a function in every active storage device after the execution of a function execution prescribed by the host processor.

means for outputting an individual bit signal by the storage device as a result of said monitoring, the signal status thereof identifying the error-free execution or, alternatively, a faulty apparatus condition and residing at a defined position within the status information that is determined for the respective storage device; and means for checking the communicated status information in the host processor and selecting a malfunctioning storage device subsequently in order to exchange further control information with it, and for identifying the nature of the error and deactivating the malfunctioning storage device in case the identified error cannot be eliminated.

* * * * *